Patented Sept. 21, 1937

2,093,454

UNITED STATES PATENT OFFICE 2,093,454

METHOD OF PRODUCING AEROGELS

Samuel S. Kistler, Urbana, Ill.

No Drawing. Application October 1, 1934,
Serial No. 746,412

23 Claims. (Cl. 252—6)

This invention relates to improvements in the art and process of producing dry gels from colloidal solutions, and the present specification is particularly directed to the production of a gel, one continuous phase of which is a gas, and which I therefore define as an aerogel.

Whenever a colloidal solution is precipitated, the product formed is usually defined as a gel. It is distinct from the precipitates from crystalloidal solutions by containing large quantities of the solvent in a soft "gelatinous" mass, usually microscopically heterogeneous and presenting some rigidity. Gels may be divided into two classes, the gelatinous precipitates and the jellies according to whether the product formed settles out in a flocculent mass or occupies the entire volume that the original solution occupied and appears microscopically homogeneous.

Gels may be again divided into elastic and non-elastic groups according to whether the gel will re-swell or not, after being dried, when placed in the original solvent. Examples of the elastic gel are gelatine and egg albumin, while examples of the non-elastic gel are silica and alumina gels.

The present invention applies to a new mode of removing the solvent from a gel, either elastic or non-elastic, in preparation for its use in the solid dried state, and the provision of a new class of products obtained thereby.

The most widely used of the inorganic gels in the dried condition for the purposes for which my product is most suited is that of silica, so that I shall describe something of its properties and mode of production, with explanation of the properties as they are now understood. I shall also list some of its commercial uses in order to indicate what may be the uses of my product.

Most of the gel now commonly used commercially is made by mixing rapidly a solution of water glass with a solution of some suitable salt or acid, usually the latter, and allowing the mixture to stand until it becomes a stiff jelly. The jelly is then broken up, washed free of salts and allowed to dry slowly. It shrinks greatly in drying and when completely dry it is a hard glassy mass. A great number of variations have been tried in the conditions of precipitation and drying but the properties of the final product can be affected only to a very limited extent. These materials are designated in the art as xerogels and are characterized and distinguishable from my products in that they can be wetted with the same liquid menstruum as employed in their preparation, and subsequently dried by simple volatilization of the liquid without changing the physical characteristics of the product materially. Thus ordinary silica gel (xerogel) can be immersed in water and subsequently dried at an elevated temperature and atmospheric pressure without changing materially its apparent density and other physical properties. On the other hand, an aerogel cannot be wetted and dried without loss of its characteristic properties. On the contrary when an aerogel is wetted and dried the drying operation results in shrinkage and other changes incident to its conversion to an xerogel.

The best theoretical treatment sets forth that the jelly is a mass of interlacing fibres. Upon removal of the liquid by drying, the surface of the liquid in trying to withdraw within the mass of submicroscopic fibres forms concave menisci, just as it forms in a small tube, and tends to draw the fibrils with it so that there is not only a shrinkage of the water, or solvent volume, but shrinkage of the entire mass. This pull of the liquid surface on the fibrils can easily be understood when it is remembered that the smaller a tube is the higher will water rise in it by capillarity. The spaces between the fibrils are the counterparts of exceedingly minute tubules.

It is therefore clear that the gel will shrink, until the fibrils are sufficiently compacted to withstand the compressive force due to the liquid surface. This force is very large, being of the order of thousands of pounds per square inch in easily imagined circumstances. With a substance as strong as silica, a point is reached where the shrinkage ceases and the water dries out, leaving a porous mass. Usually this mass contains from 30–50% voids by volume. In the extreme case that of a gel in which the drying was carried out with ferric oxide in the meshes and later the ferric oxide was dissolved out, a very fragile product was obtained having approximately 75% of its volume void.

The uses for silica gel in the dried condition depend upon the tendency of all molecules, either gaseous or in solution, to attach themselves to a surface. For a given volume of dried silica gel the internal surface is enormous so that easily condensed vapors show a very decided tendency to collect in the gel, and substances in solution can often be almost completely removed by the gel. In addition to the surface effect, there is the tendency for vapors to condense in fine capillaries much more readily than they condense in ordinary vessels.

These properties of the gel make it valuable for removing certain undesirable compounds from lubricating oils; for decolorizing sugar solutions during refining; for removal of vapors valuable or otherwise from gases such, for instance, as the removal of benzene from coke oven gas; and for drying of air, since the gel will remove water almost completely from air and can then be reactivated by simply heating and driving off the water. Its power to absorb vapors has made it serviceable in automatic refrigerator cars where it is used instead of water to absorb ammonia, and in gas masks it could easily prove valuable for removal of toxic gases.

Another important use of silica gel is as a carrier of contact catalysts. A contact catalyst is a substance that influences a chemical reaction at its surface without itself being consumed by the reaction. Since large surface is the principal requirement and since many contact catalysts are expensive, methods have been devised for coating the immense inner surface of silica gel with such catalysts, thus effecting considerable economies.

The primary object of the present invention therefore is to produce the gel by a method which will enable one at all times to have complete control thereof, whereby gels may be obtained with void space ranging all the way from the now usual 30-50% found in all commercial gels, up to 99% or higher. Another object of my invention is to provide a new class of gels—which are referred to herein as aerogels—and a method for their preparation, characterized in that they have inordinate adsorptive characteristics even as compared to the most porous active present day gels.

An additional object of my invention resides in producing a new class of colloidal products of an amorphous or essentially amorphous character, the degree of subdivision and spacial relationship of whose individual particles is the same as that in an undried gel or jelly or substantially of that order.

A further object is to produce the gels in an effective and economical manner.

The following examples illustrate embodiments of my invention:

*Example 1.*—I first form a hydrogel, such as silica hydrogel or jelly, in a suitable liquid medium, for example: water. For this purpose I may simply acidify water glass with sufuric acid in the well known manner employed in manufacturing silica gel of commerce. The gel is then washed free of soluble substances. In certain cases the gel may be, if desired, partially dried before washing in order to strengthen the mass to stand the washing action or to permit advantageous handling of the same. After being washed the gel is placed in a strong autoclave. The autoclave is nearly filled with a liquid and then closed. The liquid used may be either the water usually used in the precipitating operation or a substituted liquid more suited from a mechanical standpoint to carrying out my method as will be pointed out later. The whole mass in the autoclave is then slowly heated. Due to the expansion of the liquid with temperature, the gas space in the autoclave may be completely filled by the liquid considerably before the critical temperature is reached. In such a case continued heating would tend to cause further expansion of the liquid and thereby subject the vessel to excessive pressures. It therefore becomes necessary to release some of the liquid through a suitable valve. In practice the pressure is preferably maintained at or slightly above the critical pressure of the liquid. The minimum quantity of liquid that is advisable to use in the pressure vessel is that quantity which, when expanded to completely fill the vessel, will have the critical density. If the gel present contains this limiting quantity of liquid it is not necessary to add more.

Heating is continued (only enough liquid being released to prevent excessive pressures but not enough to produce substantial drying of the gel) until the temperature exceeds the critical temperature of the liquid in the pressure vessel. The gas is then released at a rate insufficient to damage the gel. The gel is left behind in a dried condition but having suffered little, if any, shrinkage.

If the gel is put into the vessel without added liquid, the liquid in the gel will expand with rising temperature more rapidly than evaporation into the closed space will occur, provided the total quantity of liquid present is equal to the minimum described above, and the gel will thereby not be subjected to compressive forces due to capillarity.

The principle upon which my method works is as follows:

Above the critical temperature no gas can be liquefied, regardless of how great the pressure. If the gel is covered with liquid in the autoclave, there will be no liquid-gas surface coinciding with the gel surface, and therefore there can be no compression of the gel structure due to capillarity. As the temperature rises the liquid is never allowed to evaporate down to where the gel is exposed. Now as the critical temperature is passed, the liquid is transformed into a gas imperceptibly so that whereas only a fraction of a degree below that temperature one could say that the gel is filled with liquid, when that temperature is exceeded by only the slightest amount one must say that the gel is now filled with gas. If the pressure is maintained above the critical point, no surface can form and the gel has no way of "knowing" when the liquid that it held in its meshes has been converted to a gas. Slow removal of the gas, slow only to prevent the disruption of the gel, leaves the gel in the expanded condition but dry, having at no time in the process experienced forces that would tend to compress it.

Since the surface tension of a liquid decreases as the temperature rises, becoming zero at the critical temperature, it would be possible to obtain gels in a partially shrunken condition by allowing the liquid to slowly evaporate at some temperature below the critical temperature. The nearer to that temperature that evaporation was allowed to occur, the smaller force would the gel have to withstand and consequently the less compression would it experience. The most practical method of controlling the density, however, seems to be to allow evaporation to proceed at ordinary temperatures under controlled conditions until the gel has shrunk as much as is desired, and then to place it in the autoclave and remove the remainder of the liquid as described above.

As previously stated, most gels are primarily formed in water, but water has an inconveniently high critical temperature and the critical pressure is very high, which would require very strong apparatus, if the water was continued as the liquid in carrying out the method here disclosed. Furthermore, water exerts a very powerful solvent action as the temperature rises so that some gels, for example that of silica, would dissolve before the critical temperature is reached. Silica is then precipitated as a very voluminous powder when the water is released above the critical temperature. This powder is of extremely fine texture and is valuable as a catalyst carrier in vanadium sulfuric acid catalysts. So far as I am aware this material has never been manufactured heretofore. However, in order to obtain the aerogels it is desirable and preferable, in my method, to substitute another liquid for the water. This is easily done by replacing the water in a gel with some liquid, such as an alcohol, that is very soluble or completely soluble in water. This liquid may then be replaced by other liquids miscible with it but insoluble in water.

In addition to the fact that my method enables one to obtain aerogels that could not have been prepared by known methods, it may be applied to partially shrunken gels. It therefore enables one to control completely the gel and obtain a product of just the desired density or porosity desired for a given purpose. The silica gel previously produced and which showed the maximum porosity so far obtained, possessed very little strength and has therefore not proved commercially practical. On the other hand, silica gel produced by my method and having the same apparent density, will have considerable strength and can be obtained in relatively large lumps or pieces which is not possible when made by present day methods.

As stated above, the only methods in existence prior to my invention for the control of the character of the final dried gel are crude in nature and ineffectual except over a limited range of properties. My invention enables complete control of the gel. The drying process may be stopped at any predetermined point and the liquid removed without further shrinkage of the gel skeleton. I have obtained silica gels with void space ranging all the way from the usual 30–50%, found in the present commercial gels, up to 99%, and I have certainly not reached the limit. If there were any reason for doing so, it is certain that I could obtain dry gels whose volume would be only 0.5% silica.

My improved method is applicable to all gels, and numerous gels that have never been produced in the dried condition with appreciable free space within them can now be obtained in as voluminous condition as desired. For example, aerogels of cellulose, collodion, gelatine, albumin, alumina, nickel hydroxide, thoria, titania, stannic oxide, magnesium hydroxide, chromic oxide are some of the other aerogels that I have prepared, and there is no reason to believe that the list cannot be extended almost indefinitely. The production of such gels as pyroxylin and cellulose in the distended condition offers a large field for investigation, and the probabilities are that such aerogels will prove valuable.

The aerogel seems to be particularly suited to the support of contact catalysts, especially for gaseous reactions, since gases can pass through the gels of low density with great facility and yet each molecule must come very close to a surface many, many times during the passage. Many of the catalysts can themselves be produced in the form of gels and thus do away with the necessity of supporting on silica to give them large surfaces.

In gas masks the voluminous gel may be used as an ultra-filter for the removal of submicroscopic particles from the air. Toward the end of the last war the masks were useless in combating certain extremely fine powders and fogs that were used to produce sneezing.

When a non-elastic aerogel of low density, such as that of silica, is powdered, the product is of extreme fineness and is useful as a polishing abrasive. The voluminous gel is a very excellent heat insulator.

Example 2.—Dissolve 44 grams of magnesium nitrate $Mg(NO_3)_2.6H_2O$ in a small amount of glycerin and make up to a volume of 50 cc. Thereafter add 35 cc. of diethyl amine diluted with glycerin to 100 cc. in a manner whereby the diethylamine solution floats on top of the magnesium nitrate solution. Now shake the two layers vigorously for a few seconds and allow the resulting mixture to set to a firm jelly. To remove the glycerin the jelly is extracted with alcohol until the glycerin is completely removed. The alcohol is then extracted by means of ethyl ether until most of the alcohol is removed. The resulting ether gel is then placed in a pressure vessel with excess ether, if necessary, and the temperature raised to 195° C. while maintaining the pressure sufficiently high to prevent evaporation of the ether. After the temperature has reached the critical point the vapor is permitted to escape. The resulting gel is very light, coherent, though fragile, elastic and transparent or translucent.

Example 3.—Dissolve 83 grams of chromic nitrate $Cr(NO_3)_3.9H_2O$ in 100 cc. of water to which there is then added, while stirring vigorously, 35 grams of ammonium acetate dissolved in 50 cc. of water. After the mixture is uniform it is permitted to set. A jelly will form in about 5 minutes. To remove the soluble salts the gel is broken up and washed with water, after which the water is replaced by alcohol and the alcohol is replaced, in part at least, by diethyl ether as described in Example 2. The ether-alcohol gel is then converted to the aerogel as described heretofore. The resulting product, when broken to pass a 10 mesh screen, has an apparent density of .25 gram per cc.

Example 4.—82 grams of stannic chloride $SnCl_4.5H_2O$ are dissolved in 200 grams of water and placed in a dialyzer, such as a sack made of regenerated cellulose as, for example, "Cellophane", and is then suspended in 2500 cc. of distilled water. After about 24 hours the contents of the sack will have set to a firm jelly. This jelly is then washed with methyl alcohol until most of the water has been removed, after which it is converted to an aerogel by heating to 260° C. before the vapors are released. The aerogel is very light, colorless and transparent.

Example 5.—53 grams of a commercial grade of dry thorium nitrate are dissolved in 35 cc. of methyl alcohol. The solution is allowed to stand a few hours before further use. 10 parts by volume of the aforementioned solution is then thoroughly mixed with 10 parts by volume of redistilled aniline. Subsequently 1.8–2.0 parts by volume of water are added whereby the water floats on top of the mixture. The resulting mixture is shaken vigorously for 1 to 2 seconds, and finally permitted to stand. After a very short period of time it will set into a jelly which is broken up and covered with a mixture of 9 volumes of methyl alcohol and one volume of concentrated aqueous ammonia. This mixture is changed from time to time over a period of several days until practically all of the aniline has been leached out. Finally, it is washed with pure methyl alcohol or acetone or a mixture of these two, and autoclaved to form thorium oxide aerogel.

Example 6.—380 grams of aluminum nitrate

Al(NO$_3$)$_3$.9H$_2$O are first dissolved in 1200 cc. of methyl alcohol, cooled to about −10° C. and stirred vigorously while adding 280 grams of redistilled aniline. The resulting mixture is allowed to attain room temperature at which time a firm jelly will have formed that can be extracted with methyl alcohol until free of aniline and salts. The alcohol-aluminum hydroxide jelly, or alcogel as it is referred to in the art, is then autoclaved to form an aerogel whereby an elastic, transparent product, having an apparent specific gravity of less than .1, which is relatively strong considering its low density, is obtained.

*Example 7.*—Sufficient gelatin is dissolved in hot ethyl alcohol containing sufficient acetic acid to form a firm jelly upon cooling. This jelly is then hardened by covering it with one of the higher alcohols, such as propyl or butyl, and allowing it to stand for several days. It is then extracted with ether to displace the alcohols. Alternatively, one may employ liquid propane or liquid dimethyl ether to displace, at least in part, the alcohol or alcohol-ether mixture. The resulting mixture is autoclaved at about 110° C. in the case of propane, or 130° C. in the case of dimethyl ether. Some shrinkage will be observed, but an aerogel having about 70% void space, which is strong, tough and transparent and through which gases diffuse readily, is obtained.

*Example 8.*—5 to 10 grams of agar-agar are dissolved in 100 cc. of water at its normal boiling temperature, and the solution is then allowed to cool to form a stiff jelly. The jelly is extracted with alcohol and then with ethyl ether, and finally with propane or dimethyl ether before autoclaving the same substantially as described in Example 7. The aerogel is a light, pithlike, opaque product.

*Example 9.*—A beaker is filled with a viscous collodion solution to a depth of 2 cm. Several centimeters of benzene are then carefully floated on top. After several days' standing the collodion has set to a clear, stiff jelly. The benzene containing gel is treated with liquid propane to displace the benzene, at least in part, and subsequently is converted to an aerogel which is light, strong and translucent.

In the foregoing description and examples a number of solvents have been disclosed and a number of media having more or less favorable critical temperatures have been enumerated. It will be understood that these are exemplary only and that in addition to alcohol (ethyl alcohol), methyl alcohol, acetone, dimethyl ketone, diethyl ether, dimethyl ether, benzene and propane, many other liquids may be employed. Similarly, many other combinations may be employed with the view of obtaining the aerogel forming phenomenon under the most favorable temperature and pressure conditions.

Reference is herein made to the Miller and Connolly Patent #1,772,055, wherein a silica hydrogel is heated in the presence of liquid water for the purpose of effecting a hardening of the gel. However, in this process the final removal of water is effected by the more or less conventional means and the shrinking phenomenon occasioned by the high surface tension of liquid water manifests itself. Accordingly, one obtains by this procedure a product which has an apparent specific gravity of as low as .5 but does not have the properties of aerogels. The Miller and Connolly product may be treated with water and dried, repeatedly, to obtain a somewhat similar product each time whereas my aerogel, when treated with water and subsequently dried, is converted to the xerogel having a substantially higher apparent specific gravity, otherwise lacking the characteristics of the aerogel and rather simulating the Miller and Connolly product so far as specific gravity is concerned. For example, if a silica aerogel with a specific gravity of .1 is wetted with water and subsequently dried, the resulting dried product resembles Miller's product and has a specific gravity of approximately .6. I have not been able to produce an aerogel from a gel not previously dried that will not shrink in this manner when wetted and subsequently dried in the conventional manner.

Finally, it is to be noted that the Miller and Connolly process is not capable of producing a product having the low apparent specific gravities which I am able to obtain since the limiting factor of the surface tension of the water is not overcome by Miller and Connolly. Consequently, shrinking, which attends the removal of water by conventional means, manifests itself. In general, and in the absence of purposeful preliminary shrinkage, my aerogel products are characterized in part by the fact that their apparent specific gravity is not substantially greater than 15% of the actual specific gravity of the substance.

The aerogels are distinguishable from ordinary xerogels by their inordinate catalytic activity. For example, in the vapor phase oxidation of acetaldehyde to acetic acid, a silica aerogel performs more satisfactorily than the ordinary silica gel due in part to the fact that the aerogel does not become fouled as rapidly. In comparative tests the aerogel did not show any signs of fouling during the course of the runs while the ordinary gel turned yellow and showed resinous materials deposited thereon. Thoria aerogels convert carboxylic acids, as for example acetic acid, to ketones with practically quantitative yields at 300° C., while the best form of thoria that was obtained by heating the oxalate required a reaction temperature of at least 50° higher, the conversion was incomplete and side reactions resulted in the formation of by-products. It is to be understood that for certain catalytic purposes it is desirable to have a mixed aerogel, that is, an aerogel containing more than one metallic component. These may be produced, preferably, by mixing the alcogels or ether gels before the autoclaving operation. The following example illustrates an alternative procedure for preparing one such mixed gel:

*Example 10.*—A silica hydrogel was soaked in a strong solution of aluminum sulphate for 24 hours, after which it was dropped into a concentrated ammonia solution. The resulting gel was washed with water to remove soluble salts, extracted with alcohol and autoclaved in the usual manner. This gel was found to be more active in the oxidation of acetaldehyde to acetic acid than either a silica aerogel or an alumina aerogel.

In addition to the foregoing distinguishing characteristics of the aerogels, their thermal conductivity further emphasizes the fundamental difference between aerogels as a class and xerogels or products such as Miller and Connolly describe. To illustrate: silica aerogel, having an apparent specific gravity of .18, shows a heat conductivity lower than any solid which has ever been measured so far as I have been able to ascertain. Its heat conductivity at 34° C. is $4.85 \times 10^{-5}$ cal./sec./°C./cm. This constant compares very favorably with some of the best known heat insulators of which the following are representative:

| | |
|---|---|
| Cork | $10 \times 10^{-5}$ |
| Asbestos | $22 \times 10^{-5}$ |
| Best grade of mineral wool | $7.6 \times 10^{-5}$ |
| Loose cellulose fibres | $8.4 \times 10^{-5}$ |

One of the advantages of the silica aerogel resides in its ability to withstand elevated temperatures of at least 800° C. indefinitely while other aerogels, such as alumina aerogels, will stand even higher temperatures. Ordinary silica gels (xerogels) are not much better than ordinary sand and possess no usefulness in the field of heat insulation.

Another feature of the aerogel products of the inorganic type resides in the fact that they do not pack or settle. It is well known that many finely divided materials tend to pack, leaving void spaces, and for this reason are not entirely satisfactory heat insulating media. Aerogels, on the other hand, show little or no such tendency. Moreover, while the materials are fragile, nevertheless they will support considerable weight, particularly when supported and in this respect are distinctly superior to materials such as mineral wool and asbestos which lose their valuable heat insulating properties as they are compressed or as they may settle. In other words, it is absolutely necessary, in order to preserve the heat insulating value of these materials, to preserve their fluffy nature.

Due to the porous nature of the aerogel much of the heat that is transferred passes through the gas phase. Accordingly, by substituting a gas of low thermal conductivity for air it is possible to improve the thermal resistance of the aerogels appreciably. For example, a gel that has a conductivity of 4.85 with air, has a conductivity of 4.33 when saturated with carbon dioxide and 3.71 when filled with dichlorodifluoromethane. Where the material is to serve as an insulator for refrigerator units and the like it is possible to lodge the insulator within a metal case which can be evacuated, the residual gas present being preferably one of low heat conductivity.

From the foregoing description it will be evident that I have provided a new class of products, aerogels, and various methods for their preparation. It will likewise be apparent that the aerogels are characterized by the fact that they are formed from colloidal gels in which the liquid menstruum is removed, at least in part, by heating the liquid under pressure beyond its critical temperature, and subsequently releasing the liquid thus heated. In this manner it is possible to produce a skeleton of the solid component of the gel as it actually exists before treatment and differing only in that the liquid medium is displaced by a vapor or gas. I have also shown that it is possible to produce materials in voluminous precipitated form by heating a solution thereof to or beyond the critical temperature, and releasing the sol in its gaseous state. The invention affords a novel class of materials having unique properties which render them of special importance in the field of catalysis, thermal insulation, or a variety of other uses where a high degree of porosity or fineness of subdivision is of importance.

The present is a continuation-in-part of my copending application Serial Number 508,811, filed by me on January 14, 1931.

Attention is drawn to applications covering unclaimed subject matter disclosed in this specification, including specifically application Serial Number 135,801, filed April 8, 1937.

Attention is also called to my co-pending applications, Serial Numbers 151,969, 151,970 and 151,971, filed July 3, 1937.

What I claim is:

1. That method of producing a dry aerogel comprising the steps of precipitating a colloidal substance in a liquid as a gel, confining the resulting product in a pressure vessel, applying heat thereto until the liquid in the gel has reached a temperature at which the surface tension of the liquid is so small as to produce no substantial shrinkage of the gel when the liquid is allowed to evaporate, maintaining such temperature, and then releasing the vapor from the pressure vessel at a rate insufficient to injure the gel.

2. That method of producing a dry aerogel comprising the steps of first precipitating a colloidal substance in a liquid as a gel, substituting for the first liquid a second liquid having less solvent action and a lower critical temperature, confining the resulting product in a pressure vessel, applying heat thereto until the liquid in the gel has reached a temperature at which the surface tension of the liquid is materially reduced whereby to reduce the ultimate shrinkage of the gel when the liquid is allowed to evaporate, maintaining such temperature, and then releasing the vapor from the pressure vessel at a rate insufficient to injure the gel.

3. That method of producing a dry aerogel comprising the steps of precipitating a colloidal substance in a liquid as a gel, partially drying the same to a volume greater than the volume of the completely dried product, confining the partially dried product in an autoclave, applying heat thereto until the liquid in the gel has reached a temperature at which the surface tension of the liquid is so small as to produce no substantial shrinkage of the gel when the liquid is allowed to evaporate, maintaining the temperature and then releasing the vapor from the autoclave at a rate insufficient to injure the gel.

4. That method of producing a dry aerogel comprising the steps of precipitating a colloidal substance in a liquid as a gel, confining the resulting product in a pressure vessel in an amount insufficient to entirely fill the autoclave, applying heat to the product to expand and place the liquid therein under pressure within the pressure vessel, then continuing to apply heat thereto until the liquid in the gel has reached a temperature at which the surface tension of the liquid is so small as to produce no substantial shrinkage of the gel when the liquid is allowed to evaporate, maintaining such temperature, and then releasing the vapor from the pressure vessel at a rate insufficient to injure the gel.

5. That method of producing a dry aerogel comprising the steps of first precipitating a colloidal substance in a liquid as a gel, substituting for the first liquid a second liquid having less solvent action, confining the resulting product in a closed pressure vessel, applying heat thereto until the liquid in the gel has reached a temperature at which the surface tension of the liquid is materially reduced whereby to reduce the ultimate shrinkage of the gel when the liquid is allowed to evaporate, maintaining such temperature, and then releasing the vapor from the pressure vessel at a rate insufficient to injure the gel.

6. That method of producing a dry aerogel comprising the steps of first precipitating a colloidal substance in a liquid as a gel, substituting for the first liquid a second liquid having a lower critical temperature, confining the resulting product in a pressure vessel, applying heat thereto until the liquid in the gel has reached a temperature at which the surface tension of the liquid is materially reduced whereby to reduce the ultimate shrinkage of the gel when the liquid is allowed to evaporate, maintaining such temperature, and then releasing the vapor from the pressure vessel at a rate insufficient to injure the gel.

7. The method of producing a dry aerogel characterized in that a gel consisting of a colloidal solid dispersed in a liquid menstruum is formed, after which the liquid is removed without causing substantial shrinkage of the gel, characterized in that the liquid is heated beyond its critical temperature in an autoclave without substantial release of vapor and is then subsequently vented without causing substantial condensation.

8. The method as defined in claim 7 and further characterized in that the liquid in which the gel is formed is displaced by a liquid having a lower critical temperature before the heating step.

9. A gel having an apparent specific gravity of not substantially in excess of 15% of the true specific gravity and further characterized in that it is relatively free of liquids and consists essentially of the porous skeleton of the colloid substantially as it existed in the original undried gel.

10. An aerogel consisting of a refractory substance, said aerogel having an apparent density of not substantially more than 15% of the actual density, and further characterized in that the gas present is of a lower thermal conductivity than air.

11. A method of treating gels containing substantial amounts of liquids of low solvent capacity for the gel substance dispersed therein which comprises heating the gel in an autoclave without substantial release of vapor to a temperature above the critical value for the liquid and then subsequently gradually venting the resultant vapors without condensation to obtain a porous structure.

12. A porous, substantially liquid-free gel having the cavities thereof filled with a gas, the volume of a unit of the gel being substantially that of the same unit when it is initially formed and still has the cavities thereof filled with liquid prior to drying, the gel being further characterized by the fact that when it is re-wet with a liquid and that liquid is evaporated at pressures substantially below critical that material volume shrinkage by the gel structure occurs.

13. An inorganic gel having an apparent specific gravity not substantially in excess of 15% of the true specific gravity and further characterized in that it is substantially free of liquids and consists essentially of the skeleton of the colloid substantially as it existed in the original undried gel.

14. A silica gel having an apparent specific gravity not substantially in excess of 15% of the true specific gravity and further characterized in that it is substantially free of liquids and consists essentially of the skeleton of the colloid substantially as it existed in the original undried gel.

15. A gel having an apparent specific gravity of not substantially in excess of 15% of the true specific gravity and further characterized in that it is substantially free of liquids and consists essentially of the skeleton of the colloid substantially as it existed in the original undried gel.

16. A titanium oxide gel having an apparent specific gravity not substantially in excess of 15% of the true specific gravity and further characterized in that it is substantially free of liquids and consists essentially of the skeleton of the colloid substantially as it existed in the original undried gel.

17. A thoria gel having an apparent specific gravity not substantially in excess of 15% of the true specific gravity and further characterized in that it is substantially free of liquids and consists essentially of the skeleton of the colloid substantially as it existed in the original undried gel.

18. A gel having an apparent specific gravity not substantially in excess of 15% of the true specific gravity and further characterized in that it is substantially free of liquids and consists essentially of the skeleton of the colloid substantially as it existed in the original undried gel, the gel being further characterized by a high thermal insulating power.

19. An inorganic refractory gel having an apparent specific gravity not substantially in excess of 15% of the true specific gravity and further characterized in that it is substantially free of liquids and consists essentially of the skeleton of the colloid substantially as it existed in the original undried gel, the gel being further characterized by a high thermal insulating power.

20. A substantially liquid-free gel, the volume of a unit of the gel being substantially that of the same unit before the liquid menstruum from which it was formed was substantially completely removed therefrom, the liquid-free gel being further characterized by the fact that when it is re-wet with a liquid, and that liquid is evaporated under conditions of temperature and pressure such that a substantial surface tension of the liquid is maintained during the evaporation, the volume of the gel structure undergoes substantial shrinkage.

21. A substantially liquid-free inorganic gel, the volume of a unit of the gel being substantially that of the same unit before the liquid menstruum from which it was formed was substantially completely removed therefrom, the liquid-free gel being further characterized by the fact that when it is re-wet with a liquid, and that liquid is evaporated at pressures substantially below the critical pressure, the volume of the gel structure undergoes substantial shrinkage.

22. A substantially liquid-free inorganic refractory gel, the volume of a unit of the gel being substantially that of the same unit before the liquid menstruum from which it was formed was substantially completely removed therefrom, the liquid-free gel being further characterized by the fact that when it is re-wet with a liquid, and that liquid is evaporated under conditions of temperature and pressure such that a substantial surface tension of the liquid is maintained during the evaporation, the volume of the gel structure undergoes substantial shrinkage, the gel being further characterized by a high thermal insulating power.

23. A substantially liquid-free gel of a compound containing in chemically combined form an element of group four of the periodic system of classification of the elements, the volume of a unit of the gel being substantially that of the same unit before the liquid menstruum from which it was formed was substantially completely removed therefrom, the liquid-free gel being further characterized by the fact that when it is re- wet with a liquid, and that liquid is evaporated under conditions of temperature and pressure such that a substantial surface tension of the liquid is maintained during the evaporation, the volume of the gel structure undergoes substantial shrinkage.

SAMUEL S. KISTLER.